Aug. 10, 1954  W. J. LUTEY  2,685,903
RUBBER NONSKID CROSSBAND
Filed May 4, 1951

INVENTOR.
William J. Lutey
BY
Fred C. Matheny
ATTORNEY

Patented Aug. 10, 1954

2,685,903

UNITED STATES PATENT OFFICE 2,685,903

RUBBER NONSKID CROSSBAND

William J. Lutey, Seattle, Wash.

Application May 4, 1951, Serial No. 224,473

7 Claims. (Cl. 152—222)

This invention relates to improvements in nonskid cross bands for use on pneumatic tires of motor vehicles and is in the nature of an improvement in non-skid devices of the type disclosed in my prior patents numbered 2,156,816 and 2,172,515 and 2,267,242.

This invention utilizes discarded pneumatic tires in the construction of highly efficient nonskid cross bands and in the construction of means for attaching these non-skid cross bands to the tires. In this way this invention conserves metal by providing an efficient and durable substitute for tire chains and further saves in the cost of non-skid devices by utilizing, to a large extent, material which is ordinarily wasted. This invention effects a further saving in wear on the tires to which these non-skid devices are applied by providing non-skid cross bands of rubberized material which will operate in contact with the rubber surfaces of tires without excessive wear on the tires. Also this invention provides highly efficient non-skid cross bands of pliable material which may be used to advantage as replacements for the cross links of ordinary non-skid tire chains.

An object of this invention is to provide a non-skid cross band formed of a flat strip of pliable material having U shaped non-skid members in the form of stubby tongues protruding through slots in the band and extending outwardly from said band in such a manner that they will normally bend over and lie substantially flat when they contact the road or pavement and will have their ends pointed in the correct direction to most efficiently resist skidding in the event brakes are applied to a wheel on which they are carried.

Another object of this invention is to provide non-skid cross band means which effectively resists skidding or slipping of a wheel in all directions, either starting, stopping or sidewise movement and which is highly efficient for use on soft or slippery roads, such as in mud, sand, snow and on wet or slippery pavements.

Another object of this invention is to provide a non-skid cross band having stubby tongues of elastic material which will flex and bend in such a manner as to render the non-skid cross band self cleaning in mud, snow, ice and the like.

Another object of this invention is to provide non-skid devices in which bead rings cut from discarded pneumatic tires are used as anchoring or securing means for non-skid cross bands instead of the side chains commonly used for this purpose. Tire bead rings have great tensile strength and anti-stretch properties, due to the fact that they have a plurality of turns of steel wire embedded in the reinforced rubber of which they are constructed. These bead rings are usually wasted in present day processes of salvaging material from discarded tires. My present invention provides for making efficient use of these previously wasted tire beads.

Other objects of this invention will be apparent from the following description taken in connection with the accompanying drawings.

In the drawings Figure 1 is a fragmentary side view, with parts in section showing a motor vehicle wheel and tire having thereon stubby tongue non-skid cross band devices constructed in accordance with this invention.

Like reference numerals designate like parts throughout the several views.

Figure 1:
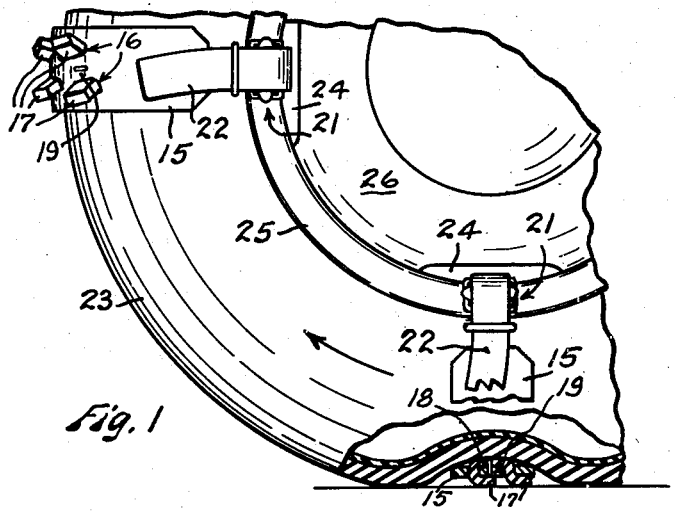
Figure 3:
Fig. 3 is a view in cross section taken substantially on broken line 3—3 of Fig. 2 and on a larger scale than Fig. 2, said view being taken diagonally across the cross band and through a U shaped pliable stubby tongue member.
Figure 2:
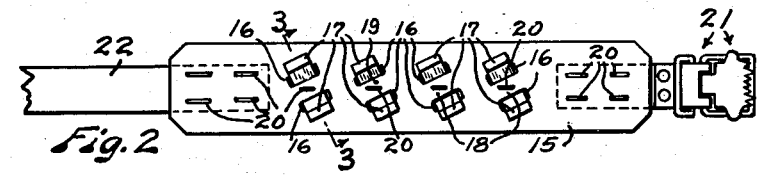
Fig. 2 is a detached plan view, with parts broken away, showing the outer side of one of the non-skid cross band devices.

One preferred form of this non-skid cross band is shown in Figs. 1, 2 and 3. This device comprises a flat cross band strip 15 of strong, tough, pliable material, such as a piece of the cord reinforced carcass or casing cut from the circumferential portion of a discarded pneumatic tire. This cross band 15 is cut in such a manner that at least a substantial portion of the reinforcing cords extend in a generally lengthwise direction in the strip to thereby insure high tensile strength.

Each cross band strip 15 has pairs of parallel spaced apart slots 16 therein. The pairs of slots 16 shown in Fig. 2 are spaced from each other longitudinally of the cross band strip 15 and the two parallel spaced apart slots of each pair are positioned diagonally of the cross band strip 15. A stubby tongue member 17 of tough long wearing resilient material, such as rubber cut from the tread portion of a discarded pneumatic tire, and which is substantially free from reinforcing cords, is bent into U shape and has its two side portions inserted through the two slots 16 of each pair.

Each stubby tongue member 17 is positioned so that the two end portions thereof protrude outwardly in diverging relation from the cross strip 15. This leaves the bight or bottom portion 18 of the stubby tongue member disposed underneath and in engagement with a portion 19 of the cross band strip 15 which lies between two adjacent slots 16. The bight portion 18 of each stubby tongue member is attached to the adjacent band portion 19 by suitable securing means, as by a clincher type staple 20.

The two end portions of the stubby tongue members 17 extend outwardly from the cross band strip 15 in diverging relation, as best shown in Fig. 3. These stubby tongue members are pliable so that outwardly protruding portions thereof will lie down on the road or pavement, as indicated at the bottom of Fig. 1, as the tire passes over them.

The slots 16 in the cross band strips 15 are positioned and dimensioned so that they do not objectionably weaken the cross band strips 15 but these slots do increase the flexibility of the strips 15 to some extent.

The incline or diagonal positioning of the slots 16 and stubby tongues 17 offsets the two stubby tongue members in each pair of slots so they are not directly in alignment either in the plane of the wheel on which they are carried or transverse to this plane. This provides a better balanced retarding effect to skidding and sliding of the wheel in all directions.

Obviously the stubby tongues 17 may be renewed or replaced in the cross band strips 15 if they become worn down or become detached from the strips 15. Also the stubby tongues 17 and cross band strips 15 will still function with fair efficiency even though the stubby tongues are worn down substantially flush with the outer surfaces of the cross band strips 15 as the slots and tongues will still both present fairly sharp edges to resist slippage in all directions.

The end portions of the cross band strips 15 are provided with suitable means by which said cross band strips 15 may be attached directly and individually to a wheel as emergency units, as shown in Figs. 1 and 2 and it will be understood that this fastening means may be varied, as hereinafter explained, to permit use of these cross strips 15 in a group on a fastening means which is applied to a tire like an ordinary non-skid tire chain. As shown in Figs. 1 and 2 each strip 15 has buckle means 21 attached to one end and strap means 22 attached to the other end thereof. When thus equipped each cross band strip 15 may be individually attached to a wheel crosswise of a tire 23, Fig. 1, by passing the strap 22 through a slot or opening 24 between a rim 25 and a disc portion 26 of said wheel and engaging the strap with the buckle means 21. Preferably the strap 22 is made from discarded tire casing having reinforcing therein to provide high tensile strength. I have found truck tires to be satisfactory for this use.

Figure 7:
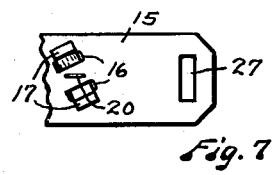
Fig. 7 is a detached fragmentary plan view of a cross band having a transverse strap receiving slot provided near one end thereof.
Figure 8:
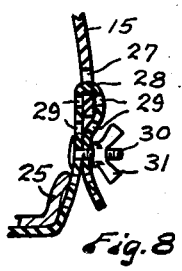
Fig. 8 is a fragmentary sectional view illustrating the manner of connecting a strap with the slotted end portion of a cross band of the form shown in Fig. 7.

Another satisfactory manner of attaching a non-skid cross band, as an individual unit to wheel is illustrated in Figs. 7 and 8. In this instance the buckle means is omitted and a transverse slot 27 is provided in the cross band strip 15 adjacent one end of said strip. A strap 28, see Fig. 8, similar to strap 22 except that it has spaced apart holes 29 provided therein, is attached to the end portion of the cross band strip 15 opposite to the end which has the slot 27. To secure the cross band strip 15 of Figs. 7 and 8 to a wheel the strap 28 is passed around a wheel rim 25 and through a slot, such as one of the slots 24 of Fig. 1 and said strap 28 is then passed through the slot 27 in the cross band strip and is doubled so as to overlap and has a bolt 30 passed through registering holes 29 and a nut 31 applied to the bolt. This provides efficient fastening means which does not require the use of a buckle.

The stubby tongue members, such as the members 17 shown in Figs. 1, 2 and 3 may each be formed of a separate piece of elastic material and may be diagonally positioned as shown in Fig. 2. Also these stubby tongue members may be positioned either lengthwise or crosswise of the cross band strip by which they are carried and all of the stubby tongue members on one cross band strip may be integral parts of one piece of resilient material.

Figure 4:
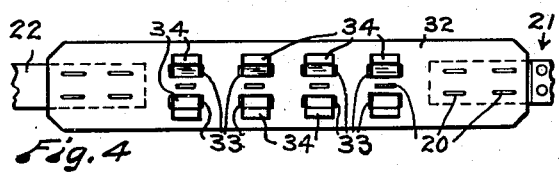
Fig. 4 is a plan view, with parts broken away, showing a non-skid cross band having stubby tongues positioned differently in the cross band from the stubby tongues in Figs. 1 and 2.
Figure 5:
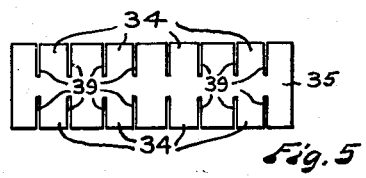
Fig. 5 is a detached plan view showing a piece of elastic material cut to form stubby tongues of the type used in the cross band shown in Fig. 4.

Fig. 4 shows a non-skid cross band comprising a cross band strip 32 having pairs of spaced apart parallel slots 33 extending lengthwise of the strip. Stubby tongue members 34 protrude through the slots 33. Fig. 5 shows a preferred way of forming all of the stubby tongue members 34 for one cross band strip 32 from one flat rectangular piece 35 of resilient material, such as a piece of rubber cut from the tread portion of a discarded tire. These stubby tongue members 34 are formed by making cuts 39 inwardly from the edges of the piece 35. In applying the piece 35 to the cross band strip 32 alternate tabs or stubby tongues 34 are bent upwardly and thrust through the slots 33 and the remainder of the piece 35 underlies the cross band strip 32 and is secured thereto as by staples 20. The major portion of the piece 35 thus serves as a fairly soft lining between the cross band strip 32 and the tire. This piece 35 is preferably free from reinforcing cords and it helps to minimize wear on the tire tread. Suitable fastening means, such as a buckle 21 and strap 22, like that shown in Fig. 2, may be used on the cross band strips 32.

Figure 6:
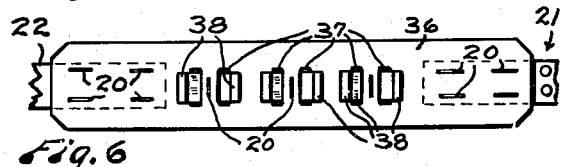
Fig. 6 is a plan view, with parts broken away, showing the outer side of another cross band having stubby tongues positioned differently from those in either Fig. 2 or Fig. 4.

Fig. 6 shows a non-skid cross band strip 36 having pairs of transverse parallel spaced apart slots 37 therein. Stubby tongues 15 of the type shown in Figs. 1 to 3 are provided in the slots 37 and are secured to cross band strip 36 as by staples 20. Buckle means 21 and strap means 22 like those shown in Figs. 1 and 2 may be used on the cross band strip 36.

Figs. 9 to 12 inclusive show a plurality of these non-skid cross bands connected with the bead ring portion 40 of a discarded pneumatic tire to provide a non-skid assembly of a type adapted to be applied to and secured on a tire like an ordinary non-skid tire chain and which may be used in place of an ordinary tire chain.

Figure 9:
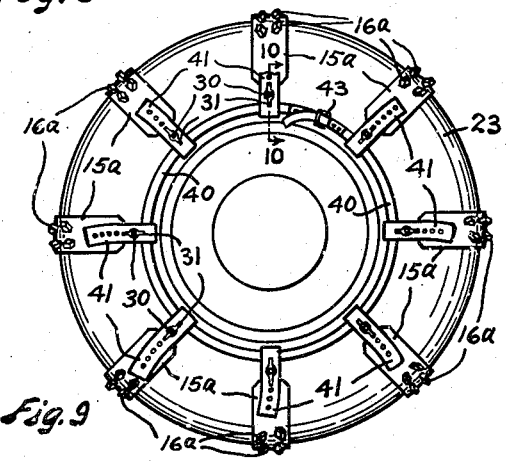
Fig. 9 is a side view of a wheel using a tire bead which has been cut from a discarded tire as a means for attaching to said wheel and the tire thereof a plurality of these non-skid cross bands.

The cross band strips 15a and stubby tongues 16a shown in Fig. 9 are similar to parts 15 and 17 shown in Figs. 1 to 3 but it will be understood that they may be similar to the cross band strip and stubby tongue means shown in either Fig. 4 or Fig. 6. The fastening means for the cross band strips 15a are designed to facilitate attachment of the cross band strips 15a to a tire bead 40. Also the fastening means for strips 15a are designed so they may be attached to the side chains of an ordinary tire chain. Each cross band strip 15a has duplicate fastening means in the form of a strap 41 secured to each end of the cross band strip. Each strap 41 has a plurality of holes 43 provided therein. Each strap 41 is adapted to be passed around a tire bead member 40, see Fig. 10, and doubled back and fastened by passing a bolt 30 through two registering holes 43 of said strap and applying a nut 31 to the bolt. The straps 41 are preferably of reinforced rubber and the bolts 30 and nuts 31 may be applied so as to tighten these straps around the rubber coated tire bead member 40 sufficiently to prevent the straps 41 from slipping around on the tire bead member 41 when in use.

Figure 11:
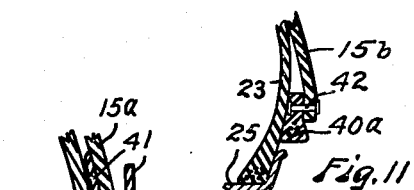
Fig. 11 is a fragmentary sectional view showing modified means for attaching an end portion of a non-skid cross band to a tire bead member which has been cut from a discarded tire.

In some instances the end portions of cross band strips, such as 15b, Fig. 11, may be fixedly and permanently attached to a bead ring 40a, which has been cut from a discarded tire, as by the use of rivet or staple means 42. When this permanent form of attachment is to be used preferably a substantial amount of tire side wall is left attached to the bead ring 40a to provide ample area for attachment of the staple or rivet 42.

Figures 10, 12:
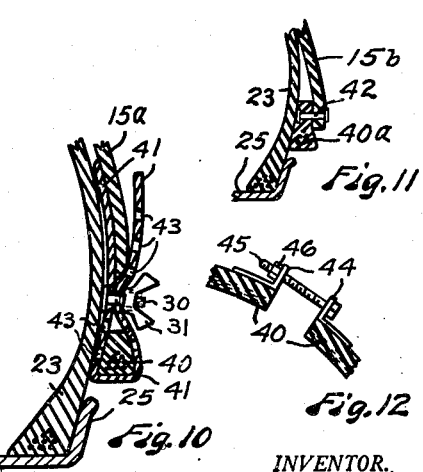
Fig. 10 is a fragmentary sectional view on a larger scale than Fig. 9 and taken on broken line 10—10 of Fig. 9 and showing a non-skid unit attached to a tire bead which has been cut from a discarded tire.
Fig. 12 is a fragmentary sectional view showing modified means for attaching together two adjoining end portions of a tire bead member which has been cut from a discarded tire and is used as a holding means for a plurality of these non-skid cross bands.

The tire bead, such as 40 and 40a are severed at least at one point to facilitate application to a wheel and tire. The two adjoining end portions of each bead ring, such as 40, may be detachably and adjustably connected together by strap and buckle means 43, as shown in Fig. 9. Also, as illustrated in Fig. 12, angle brackets 44 may be secured to the adjacent end portions of a bead ring 40 and a bolt 45 with nut 46 thereon used to releasably and adjustably connect the angle brackets 44.

The mode of operation of these non-skid devices and the methods of applying the same to tires will be apparent from the foregoing description. These non-skid devices are made almost entirely from discarded tires and for this reason are inexpensive and durable in construction and tend to conserve metal. These non-skid cross bands are highly efficient in operation, are long lasting, do not subject the tires to which they are applied to excessive wear and will not seriously injure fenders if the cross bands come loose on the tires.

The stubby tongues bend in the general direction in which a vehicle is traveling when they contact a pavement. In this position these tongues are highly efficient in stopping a vehicle when brakes are applied because the ends of the stubby tongues tend to brace against the pavement and check forward movement. At the same time these stubby tongues are also efficient in resisting side skid. Being flexible the stubby tongues are self cleaning in mud, snow and the like.

The foregoing description and accompanying drawings clearly disclose preferred embodiments of this invention but it will be understood that these disclosures are illustrative and that changes may be made within the scope of the following claims.

I claim:

1. A non-skid cross band for tires comprising a flat cross band strip of pliable material having pairs of spaced apart slots extending therethrough; and a U shaped pliable elastic member disposed in each pair of slots with the two side portions of the U shaped elastic member extending through the respective slots from inside to outside of the cross band strip and projecting beyond the outer surface of the cross band strip.

2. A non-skid cross band for tires comprising a flat cross band strip of pliable material having pairs of spaced apart slots extending therethrough; a U shaped pliable elastic stubby tongue member disposed in each pair of slots with the two side portions of the U shaped elastic stubby tongue member extending through the respective slots from inside to outside of the cross band strip and projecting a substantial distance beyond the outer surface of the cross band strip; and means securing the bight portion of each U shaped elastic stubby tongue member to the cross band strip between the two adjacent slots.

3. A non-skid cross band for tires comprising a flat cross band strip of pliable material having pairs of diagonally positioned spaced apart slots extending therethrough; and a U shaped pliable elastic stubby tongue member disposed in each pair of slots with the two side portions of the U shaped stubby tongue member extending through the respective slots from inside to outside of the cross band strip and protruding a substantial distance beyond the outer surface of the cross band strip.

4. A non-skid cross band for tires comprising a substantially flat cross band strip of pliable reinforced rubber material adapted to extend across the tread portion and around the sides of a pneumatic tire and having pairs of spaced apart slots therein, the two slots of each pair extending diagonally of the cross band strip and being substantially parallel to each other and longitudinally offset relative to each other; securing means connected with at least one end portion of said cross band strip; U shaped stubby tongue members of pliable elastic material disposed in said slots with the two side portions of each U shaped stubby tongue member projecting respectively through the two slots of a pair from inside to outside of the cross band strip and protruding beyond the outer surface of said cross band strip and with the bight portion of each U shaped stubby tongue member engaged under a portion of said cross band strip between the two slots of a pair; and means securing the bight portion of each U shaped elastic stubby tongue member to the cross band strip between two adjacent slots.

5. A non-skid cross band for tires comprising a flat cross band strip of pliable material having pairs of longitudinally extending spaced apart slots therein; and a U shaped pliable elastic stubby tongue member disposed in each pair of slots with the two side portions of the U shaped stubby tongue member extending through the two slots of the pair from inside to outside of the cross band strip and protruding a substantial distance beyond the outer surface of the cross band strip.

6. A non-skid cross band for tires comprising a flat cross band strip of pliable material having pairs of transversely extending spaced apart slots therein; and U shaped pliable elastic stubby tongue members disposed in the respective pairs of slots with the two side portions of each stubby tongue member disposed in the respective slots of a pair and extending through the slots from inside to outside of the cross band strip and protruding a substantial distance beyond the outer surface of the cross band strip.

7. A non-skid cross band for tires comprising a flat cross band strip of pliable material having a plurality of pairs of spaced apart slots extending therethrough; and U shaped stubby tongue members of tough pliable rubber tread stock disposed in said slots with the two side portions of each U shaped stubby tongue member extending through the respective slots of a pair from inside to outside of said cross band strip and protruding a substantial distance beyond the outer surface of the cross band strip, whereby said stubby tongue members will lie flat on a roadbed when they are between a roadbed and a tire.

References Cited in the file of this patent

UNITED STATES PATENTS

| Number | Name | Date |
|---|---|---|
| 1,251,014 | Greenerd | Dec. 25, 1917 |
| 1,578,803 | Comey | Mar. 30, 1926 |
| 2,267,242 | Lutey | Dec. 23, 1941 |
| 2,560,198 | Stevens | July 10, 1951 |
| 2,570,689 | Kennedy | Oct. 9, 1951 |